Dec. 3, 1940.    M. BURLEY    2,223,843
ACTUATING MECHANISM FOR VEHICLE PARKING METERS
Filed Oct. 31, 1938    4 Sheets-Sheet 1

Dec. 3, 1940.  M. BURLEY  2,223,843
ACTUATING MECHANISM FOR VEHICLE PARKING METERS
Filed Oct. 31, 1938  4 Sheets-Sheet 3

Inventor
Matthew Burley

Dec. 3, 1940.  M. BURLEY  2,223,843
ACTUATING MECHANISM FOR VEHICLE PARKING METERS
Filed Oct. 31, 1938    4 Sheets-Sheet 4

Patented Dec. 3, 1940

2,223,843

UNITED STATES PATENT OFFICE 2,223,843

ACTUATING MECHANISM FOR VEHICLE PARKING METERS

Matthew Burley, Miami, Fla., assignor to Henry O. Shaw and Martin L. Shaw, both of Miami, Fla.

Application October 31, 1938, Serial No. 237,870

18 Claims. (Cl. 194—84)

This invention relates to coin-controlled timekeeping mechanisms, and particularly to that type of mechanism known as a "parking meter" which is adapted to indicate the time elapsed after the insertion of a coin. Instruments of this type are intended to be placed along the side of a street and to be spaced sufficiently far apart so that one automobile can be parked opposite each instrument. Drivers of automobiles, parking their cars alongside of the parking meters, are supposed to deposit coins in the meters as a condition precedent to their being allowed to park for a certain predetermined length of time. The meters indicate the elapse of time after the deposit of a coin, and a patrolman can ascertain, by observing the meter, whether an automobile parked alongside of a meter has been parked there without the deposit of a coin or has been parked longer than the allowed time.

One of the principal objects of this invention is to provide a compact and simple mechanism which will receive a coin and measure an interval of time after the deposit of the coin.

Another object of this invention is to provide a parking meter which will not only indicate the end of the period of time after the deposit of a coin during which parking is allowed, but which also will indicate the length of time which has elapsed since the end of that period of time. In other words, it is an object of the present invention to provide a parking meter which will not only measure the legal parking time but which will also measure the overtime parking.

Another object of the present invention is to provide a parking meter mechanism in which means are provided by which each depositor of a coin is obliged to rewind the timekeeping mechanism, thus making each parking meter independent of any other source of energy.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

The embodiment of the invention shown in the drawings comprises a housing 21 which is adapted to fit on the top of and be supported by a pole 22 erected at the side of a street. The lower portion of the housing 21 contains a removable coin receptacle or box 23 which is accurately positioned in the housing by a horizontal partition 24 above it and by lugs 25 in front of it. The removable coin receptacle 23 can thus be slid in or out of place and is normally held in position by a removable back plate 26.

The back plate 26 covers the lower portion of a large opening in the back of the receptacle or housing 21, and is secured in place by a single bolt 27 which is secured to the cylinder 28 of a lock 29 mounted on the back plate. The edge of the back plate 26 around its two sides and bottom fits against a shoulder around the edge of the opening in the back of the housing 21, so that the single bolt 27 serves to firmly hold the back plate 26 in place. Thus, to remove the back plate 26 so as to allow a full coin receptacle to be removed and to be replaced by an empty one, all that is necessary is to insert a key in the lock 29 and unscrew the bolt 27.

The coin receptacle 23 may be of conventional construction, such as those used in telephone pay stations or in other controlled apparatus and provided with a seal 31 to prevent its being opened without detection by the individual assigned to the duty of collecting the various coin receptacles from the various parking meters and replacing them with empty ones and bringing the receptacles containing coins to an official charged with the duty of removing and accounting for the contents of the receptacles.

The upper part of the housing 21 contains the time keeping mechanism 32 and the coin controlled mechanism 33 of the parking meter. The time keeping mechanism 32 is in the front part of the housing behind a glass or crystal 34 through which the dial 35 and the time indicating hand 36 of the time keeping mechanism can be seen. The coin controlled mechanism 33 is at the back of the housing directly above the coin receptacle 23 and is arranged to receive a coin inserted through a slot in a projection 37 on the side of the housing and to discharge the coin into a slot in the top of the coin receptacle 23. The time keeping mechanism 32 and the coin controlled mechanism 33 are joined together to form a single unit assembly which can be slid into or out of the housing 21. This assembly comprises a back plate 38 which carries and forms a part of the coin controlled mechanism 33, and a center plate 39 which carries and forms a part of the time keeping mechanism 32. The back plate 38 and the center plate 39 are rigidly jointed together by three pillars 41 riveted to the back plate 38 and receiving screws extending through the center plate 39. The edge of the back plate 38 fits against a shoulder around the opening in the back of the housing 21 in order to limit the forward movement of the assembly formed by the time keeping mechanism 32 and the coin controlled mechanism 33 when they are placed in the housing 21. The assembly is positioned laterally by the side edges of the back plate 38 which fit accurately within the opening within the housing 21 and by a pair of guide pins or studs 42 which project back from the front of the housing 21 and fit into holes 43 (shown in Fig. 10) in the lower part of the center plate 39. The pins 42 also serve to position the assembly of the time keeping mechanism 32 and coin controlled mechanism 33 vertically. Thus, the assembly 32, 33 is held against movement in an upward direction or in a downward direction or to either side or forward, but is free to be slid out through the back of the housing 21 when the lower cover plate or back plate 26 is removed. When the cover plate 26 is in position, it holds the assembly 32, 33 in the housing because the coin-discharge tube 88, through which coins pass from the coin controlled mechanism 33 to the coin receptacle 23, extends down in front of and in contact with the removable cover plate 26. Thus, removal of the cover plate 26 not only allows access to the coin receptacle 23, but also allows the time keeping mechanism and coin controlled mechanism to be removed without the use of tools.

Time keeping mechanism

The time keeping mechanism shown in Figures 4, 6, 8, 9 and 10, is carried on the front of the center plate 39 and is enclosed in a case 44. This mechanism comprises a pair of plates 45 and 46 in which are journaled the shafts of a conventional clock work mechanism, having a main spring 47, a train of gears, an escapement, a balance wheel 48, and a hair spring 49. The main spring 47 is carried by and has its inner end secured to the central arbor or shaft 51 of the clock work mechanism, and the other end of the main spring is fixed to a stud 50 carried by one of the frame plates 45 of the clock work mechanism. A ratchet wheel 52 is rotatably mounted upon the arbor 51 and is normally caused to rotate with the arbor by means of a friction clutch arrangement comprising a friction washer 53 pressed against one side of the ratchet wheel 52 by a group of Belleville washers 54 which act as springs. The first gear 55 of the gear train of the clock work mechanism is journaled upon the hub of the ratchet wheel 52 and is provided with a plurality of spring-pressed pawls 56 for engaging the teeth of the ratchet wheel 52. The pawls 56 and gear 55 are arranged so that, as the main spring 47 unwinds and rotation of the arbor 51 occurs, the gear 55 will be driven or rotated with the arbor 51 and so that the arbor 51 can be rotated in the opposite direction and the spring rewound without causing rotation of the gear 55. The friction clutch arrangement provided by the friction washer 53 and the Belleville washers 54 serves only to prevent excessive loads being placed upon the gear 55 during cleaning, testing, and repairing of the clock-work mechanism and does not function during the normal operation of the device. If desired, the friction washer 53 and the Belleville washers 54 can be omitted and the ratchet wheel 52 may be secured directly to the arbor 51.

The arbor 51 projects through the plate 39 which lies in back of and which carries the clock work mechanism and has an arm 57 fixed to it in back of the plate 39. The end of this shaft is squared and the hole in the arm is made to fit, the end of the arm being split and provided with a clamping screw 58 so that it may be secured tightly in place.

The arbor 51 has a hole drilled through it from end to end and contains a spindle 59 which projects out of each end of the arbor and which is rotatable therein. The front end of the spindle 59 projects through the case 44 of the clock work mechanism and through the face or dial 35 of the parking meter and carries an indicating hand 36 fixed to it so as to sweep around the dial 35 as the spindle 59 is rotated. The front end of the spindle 59 is also provided with a spiral spring 61, similar to the hair spring of a clock, which has one end fixed to the collar 67 on the spindle 59 and the other end fixed to one of a group of studs 62 which support the dial 35 on the front of the clock work case 44, the spring 61 lying between the dial 35 and the clock work case 44. The spiral spring 61 is arranged so that it tends to rotate the spindle 59 in the same direction as that in which the main spring 47 tends to rotate the arbor 51.

The rear end of the spindle 59 carries a collar 63 on which is secured a radially extending arm 64. The collar 63 also serves as an abutment for a coil spring 65 surrounding the spindle 59 and lying between the collar 63 and a cup-shaped washer 66 bearing against the rear end of the arbor 51. The coil spring 65 tends to slide the spindle 59 toward the rear end of the arbor 51, the movement of the spindle 59 in this direction being limited by a collar or shoulder 67 on the front end of the spindle which bears against the front face of the clock work case 44.

Figures 7, 8, 9, 10:
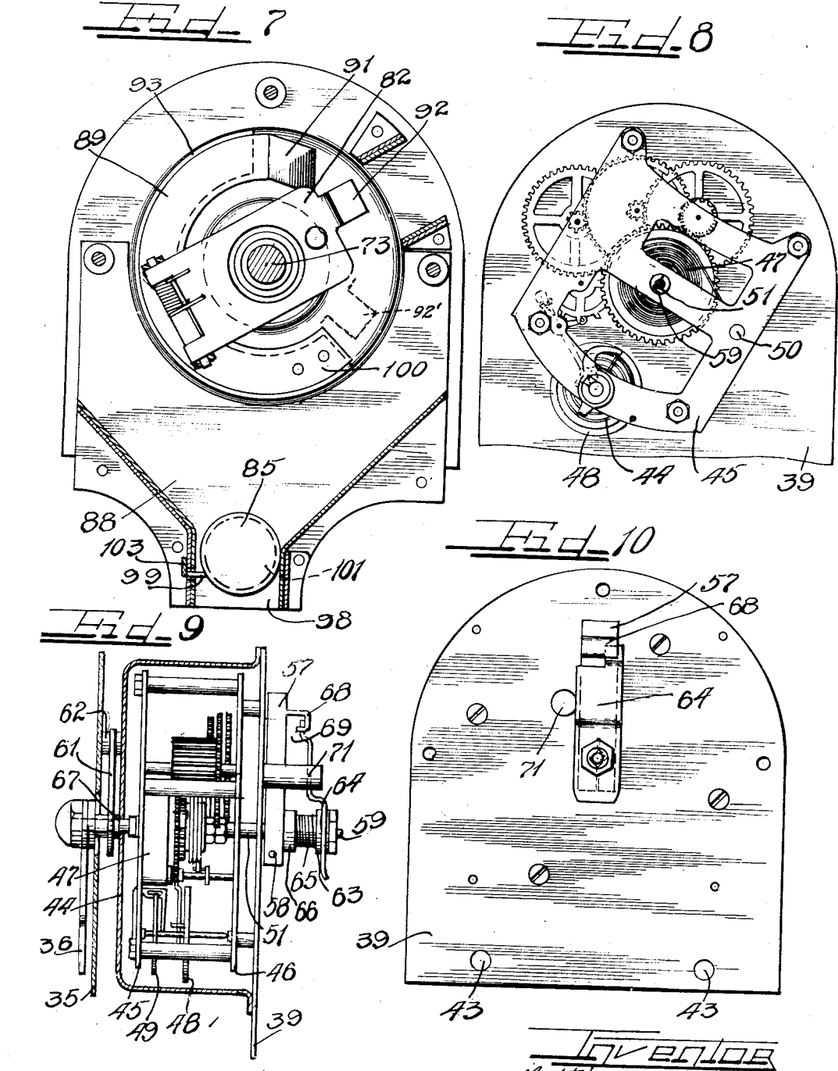
Figure 7 is a cross-sectional view taken on the line VII—VII of Figure 4 and looking in the direction of the arrows.
Figure 8 is a front elevational view of the clock work mechanism with its case removed, as seen from the line VIII—VIII of Figure 4.
Figure 9 is a side elevational view of the clock work mechanism shown in Figure 8 with the case and dial shown in section as seen from the line IX—IX of Figure 4 and looking in the direction of the arrows.
Figure 10 is a rear elevational view of the portion of the mechanism shown in Figure 9, showing the plate bearing the clock work mechanism and the parts immediately in back of that plate as they would be seen from the line X—X of Figure 4, looking in the direction of the arrows.

The arm 57 on the arbor and the arm 64 on the spindle passing through the arbor form a means for detachably connecting the spindle 59 to the arbor 51 so that they will rotate together. In order to accomplish this, the arm 57 on the arbor is provided with a hook-shaped projection 68 which extends around the end of the arm 64 on the spindle and which bends in toward the axis of the arbor and the spindle and which finally bends forward towards the body of the arm 57, as shown in Figure 9, the final portion of the hook-like projection 68 being located so that it will be in the path of the end of the arm 64 on the spindle. The spiral spring 61 on the front end of the spindle 59 holds the spindle turned in a clockwise direction, as seen from the front of the device, so that the end of the arm 64 on the spindle is held against the inturned end of the hook-like projection 68 on the arm 57 on the main shaft or arbor 51 of the clock work mechanism. In order that the two arms 57 and 64 may be in line with each other, the ends of the arm 64 on the spindle and of the hook-like projection 68 on the other arm 57 each have one side cut away so that they can overlap, as shown in Figure 10, before coming into contact with each other.

The arm 64 on the spindle 59 and the hook-like projection 68 on the other arm 57 are shaped so that they come into engagement when the spindle 59 is held rearwardly by the helical spring 65. When the spindle 59 and the arm 64 carried by it are slid forward against the action of the spring 65, the end of the arm 64 is moved forward so that it no longer engages the hook 68 on the other arm 57, but is able to pass through a gap 69 between the end of the hook 68 and the body of the arm 57. When thus moved forward, the spindle 59 and the arm 64 are free to rotate independently of the other arm 57 and are turned in a clockwise direction, as seen from the front of the device, by the spiral spring 61 behind the face or dial 35 of the instrument. Rotation of the spindle 59 and arm 64 in this direction is limited by a stop 71 projecting out from the back of the central plate 39 which carries the clock work mechanism. The stop 71 also serves to limit the rotation of the other arm 57 secured to the main arbor of the clockwork mechanism.

The above described arrangement permits both the main arbor 51 of the clock work mechanism and the spindle 59 extending through it to rotate through a little less than a full turn, that is, from one side of the stop 71 around to the other side of the stop 71. Both the arbor 51 and the spindle 59 within it are urged to rotate in a clockwise direction by springs, the arbor 51 being thus urged by the main spring 47 and the spindle 59 being thus urged by the spiral spring 61 lying between the front of the clock work case 44 and the dial 35. The speed of rotation of the main arbor 51 under the influence of the main spring 47 is governed by the clockwork mechanism. The arbor 51 can be rotated in a counter-clockwise direction also, rotation in this direction being permitted by the ratchet mechanism 52, 56, through which the arbor is connected to the gear train of the clock work mechanism. Rotation in this direction serves to rewind the main spring 47. The spindle 59 will be rotated by its spiral spring 61 in a clockwise direction at the same slow speed as the arbor 51 when the arm 64 on the spindle is engaged with the hook-like projection 68 on the arm 57 on the arbor 51, but when the spindle 59 is slid forward, the spiral spring 61 will immediately rotate it against the stop 71. Also, when the spindle 59 is slid forward so that the end of the arm 64 will pass through the gap 69 at the end of the projection 68 on the other arm 57, the arm 64 can be swung around from a position against the stop 71 and past the arm 57, whereupon the spindle 59 may be allowed to be moved back to its rearmost position by the spring 65 and the end of the arm 64 to be swung back into engagement with the hook 68 on the other arm 57 by the spiral spring 61. These various movements of the two arms 57 and 64 and of the arbor 51 and spindle 59 which carry them are brought about through the agency of the coin controlled mechanism which is mentioned briefly above and which is described in detail below.

*Coin controlled mechanism*

The coin controlled mechanism comprises a disk 72 fixed to a shaft 73 which is journaled in a bearing 74 carried by the back plate 38 and which can be rotated by a handle or crank 75 fixed to the end of the shaft 73 on the outside of the back plate 38. The face of the disc 72 carries a coin tube 76 which extends diametrically across it and is secured to it by a pivot 77, which allows it to swing forward away from the disc 72 or back toward the disc 72. A pair of parallel lugs 78 extend up from the disc 72 on each side of the coin tube 76 and cooperate with the pivot 77 to prevent any lateral movement of the coin tube 76 relative to the disc 72, while allowing free forward or backward swinging.

Figures 11, 12, 13, 14:
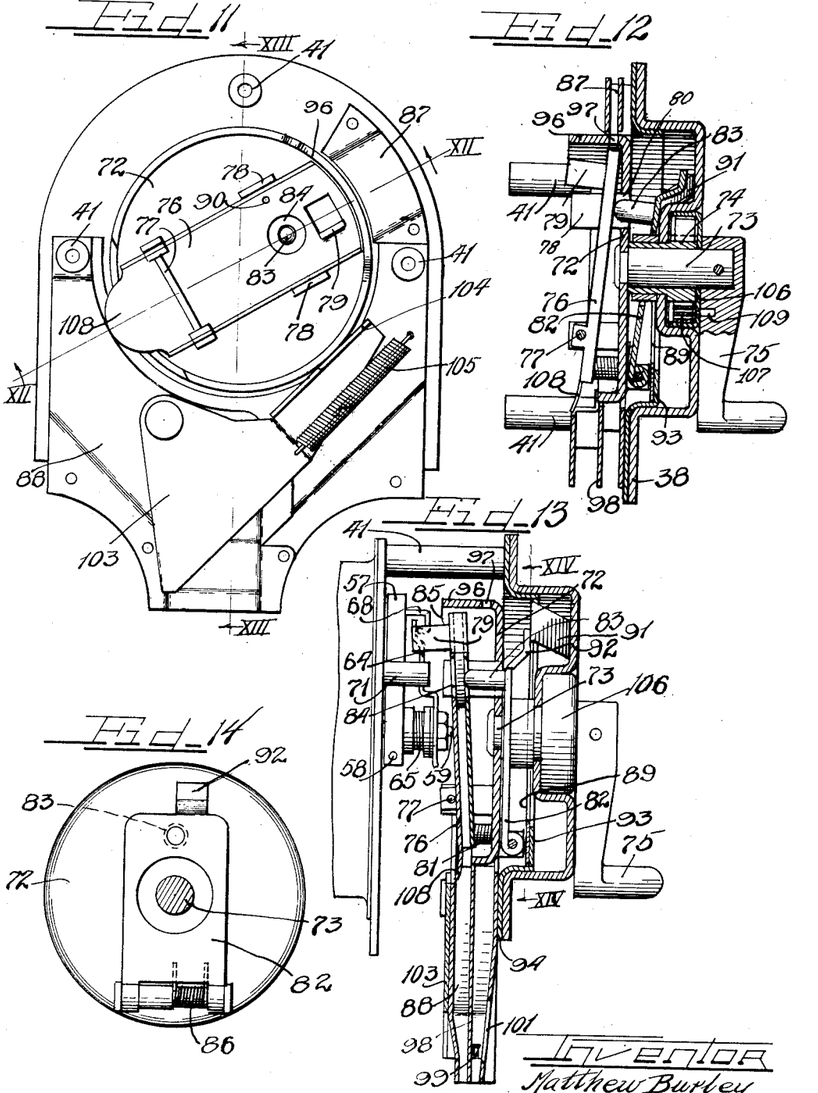
Figure 11 is a front elevational view of the coin controlled portion of the invention as seen from the line XI—XI of Figure 4, looking in the direction of the arrows.
Figure 12 is an oblique cross-sectional view taken on the line XII—XII of Figure 11 and looking in the direction of the arrows.
Figure 13 is a vertical cross-sectional view of the coin controlled portion of the apparatus taken on the line XIII—XIII of Figure 11 and looking in the direction of the arrows, the movable parts being shown in a slightly different position than in Figure 11 and a portion of the time keeping mechanism being shown in elevation.
Figure 14 is a rear elevational view of a part of the coin controlled portion of the apparatus as seen from the line XIV—XIV of Figure 13 and looking in the direction of the arrows.

The coin tube 76 is provided with a lug 79 which projects towards the clock work mechanism far enough so that it will be able to engage the edge of the arm 64 on the spindle 59 and the edge of the hook-shaped projection 68 on the clockwork arm 57, as shown in Figure 13, when the coin tube 76 is swung forward away from the disc 72. The lug on the coin tube is short enough so that, when the coin tube lies against the disc 72, as in Figure 12, the lug will be able to pass in back of the spindle arm 64 and the projection 68 on the clock work arm without touching them.

The coin tube 76 is normally held back against the disc 72, as shown in Figure 12, by a spring 81 so that rotation of the crank 75 and the disc 72 will not cause rewinding and resetting of the timekeeping mechanism. When the proper coin is inserted, the coin tube is caused to swing forward by a coin tube operating lever 82 which is pivoted to and extends across the back of the disc 72. The lever carries a stud 83 which extends through a hole 80 in the disc 72, the hole 80 being formed by the punching out of the lugs 78. The stud 83 can pass also through holes 84 in the front and rear walls of the coin tube when the lever which carries it is swung forward against the back of the disc 72. Thus, when the coin tube 76 is empty, movement of the lever 82 and stud 83 will not move the coin tube from its inoperative position back against the disc because the end of the stud 83 will pass right through the holes 84 in the coin tube.

When there is a coin 85 in the proper position in the coin tube, it blocks the passage of the stud 83 through the openings 84 and causes the coin tube to swing forward with the coin tube operating lever 82 into its operative position as shown in Figure 13. In order to retain a coin 85 in the proper position, the coin tube is provided with a stop 90 extending across it near one side. The stop 90 is placed near one edge of the coin tube so that it will stop only coins of the size with which the parking meter is intended to be operated. Smaller coins will roll under the stop 90 and out of the lower end of the coin tube and into a hopper 88, which drops them through slots in the partition 24 above the coin receptacle 23 and in the top of the coin receptacle.

Coins larger than the proper size cannot be inserted into the device. Other coins can be inserted into the coin receiving opening in the projection 37 on the side of the housing 21 and are guided into the coin chute by a sheet metal guide 87 fixed to the back plate 38, the coin passing through a slot 97 in the flange 96 on the disc 72.

The coin chute operating lever 82 is normally held back away from the coin tube, as shown in Figure 12, by a spring 86 and is arranged to be swung forward when the disc 72 is rotated and held in its swung-forward position, as shown in Figure 13, by a C-shaped cam member 89. The cam member 89, as shown in Figures 7, 12, and 13, consists of a flat portion extending approximately five-eighths of the distance around the shaft 73 which carries the disc 72 and the coin tube operating lever 82, and an inclined portion or ramp 91 at one end of the flat portion.

Figures 1, 2, 3:
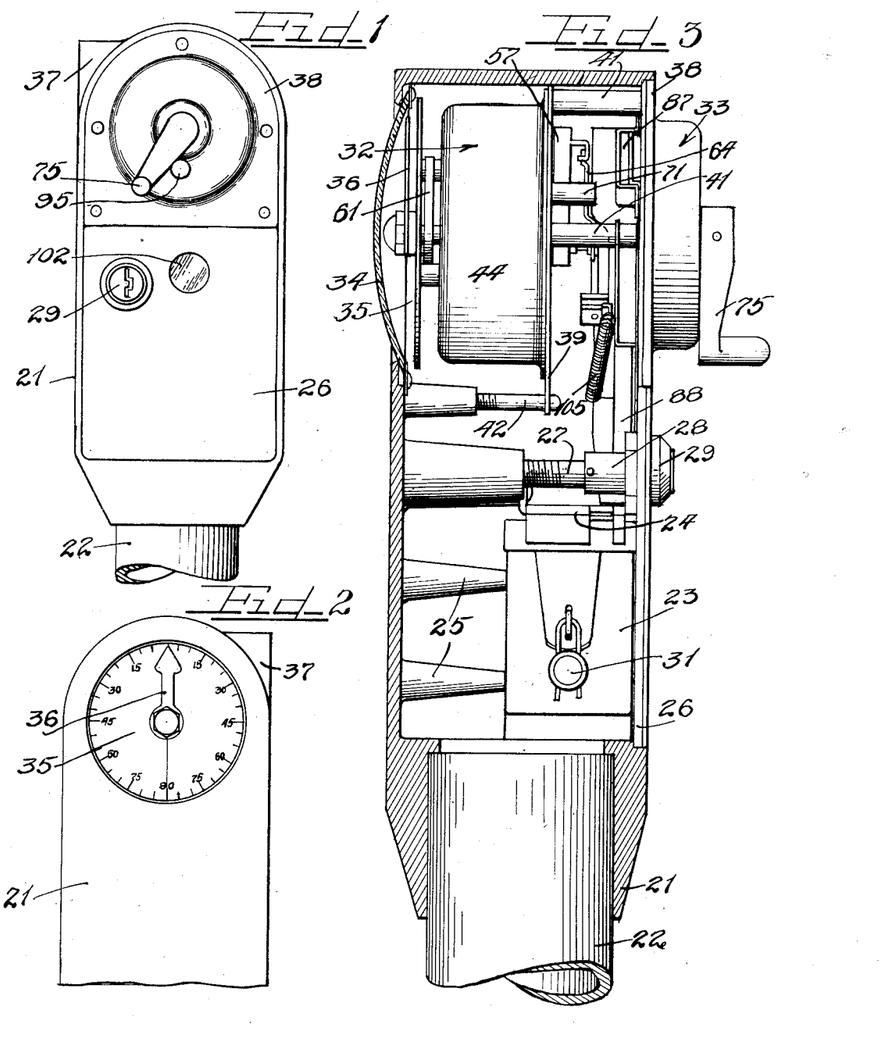
Figure 1 is a rear elevational view of one of the preferred embodiments of my invention.
Figure 2 is a front elevational view of the embodiment of the invention shown in Figure 1.
Figure 3 is a central vertical section through the housing of the invention with all of the interior mechanism shown in elevation.
Figure 4:
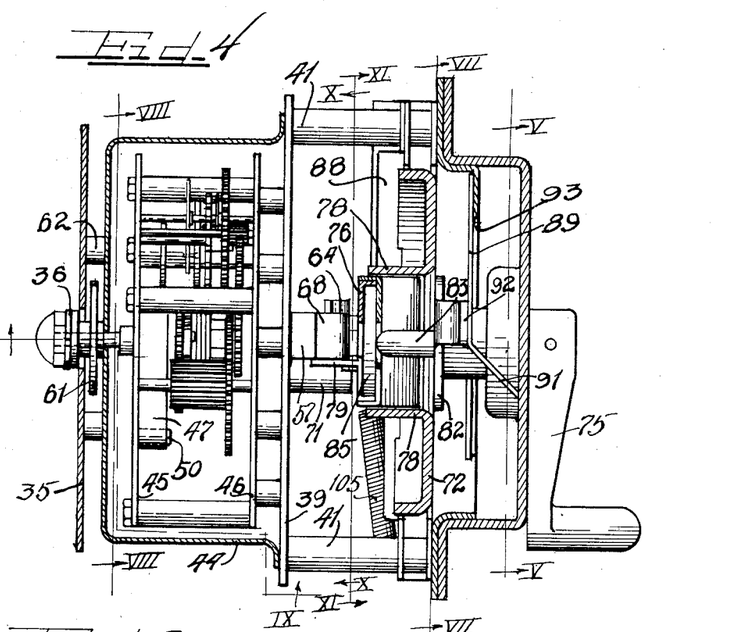
Figure 4 is a plan view of the interior mechanism with certain portions broken away and shown in section.

The complete cam member 89, 91 occupies about three quarters of a circle and has a gap of about a quarter of a circle, and it is located so that, when the handle 75 is in its initial position shown in Figure 1, the end 92 of the coin tube operating lever 82 will lie in the gap, as shown in Figure 7. Then, when the coin tube operating lever 82 is swung around by rotating the handle 75, its end 92 will strike the ramp 91 and will ride up onto and be held forward by the flat portion of the cam member 89. When the handle 75 has been turned as far as it will go, the end 92 of the coin tube operating lever 82 will have been swung around over the entire length of the cam 89 and will be back in the gap between the ends 91 and 100 of the cam as shown in dotted lines 92' in Figure 7. As soon as the end 92 of the coin operating lever passes the end 100 of the cam member, it is swung back by the spring 86 shown in Figure 14, and it will be in a position to pass under or in back of the cam member as the handle 75 is rotated back to its original position. In order to allow the end 92 of the lever to pass under the cam 89 and ramp 91 and reach its original position in front of the ramp, as shown in Figures 7 and 12, the entire cam member 89 is made of a piece of spring metal and is secured only at its end 100 remote from the ramp 91, as shown in Figure 7. The fixed end 100 of the cam member 89 is riveted to an arcuate flange 93 on a bracket or plate fixed to the back plate 38. This construction allows the inclined ramp 91 to be moved bodily forward out of the way by the end 92 of the lever 82 so that the end of the lever can return to its original position.

The angle through which the disc 72 carrying the coin tube 76 and the coin tube operating lever 82 can be rotated is determined by a stop 95 on the back of the instrument in the path of the handle 75. The stop 95 is placed so that when the handle is up against one side of the stop, as shown in Figure 1, the coin tube 76 and the coin tube operating lever 82 are in the positions shown in Figures 7, 11 and 12 with the end 92 of the coin tube operating lever about to ride up on the ramp 91. The cam member 89 extends around far enough so that it will support the end 92 of the coin tube operating lever 82 as the handle 75 is rotated around toward the other side of the stop 95, the cam member 89 terminating at a point which will allow the end 92 of the coin tube operating lever 82 to drop off when the handle 75 reaches the other side of the stop 95.

Thus, when the handle 75 is rotated from one side of the stop 95 around to the other and then back to its original position, the coin tube operating lever 82 will swing forward as shown in Figure 13 and will stay in its forward position as it rotates with the handle 75 until the handle 75 reaches the other side of the stop 95. At that point, the coin tube operating lever 82 will drop back and will remain back as the handle 75 is returned to its original position. At the same time, if there is no coin in the coin chute or tube 76, the coin tube 76 will rotate with the handle 75 without being projected forward, and without the lug 79 on the coin tube engaging any part of the time keeping mechanism. If, however, a coin 85 is in the coin tube, the stud 83 on the coin tube operating lever 82 will strike the coin 85 as the lever 82 swings forward, causing the coin tube also to swing forward. Thus, when a coin 85 is in the coin tube 76 and the handle 75 is rotated from one side of its stop 95 around to the other and back again, the coin tube 76 will swing forward and rotate around with the handle 75 until the handle reaches the other side of the stop 95, whereupon the end 92 of the coin tube operating lever 82 will drop off of the end of the cam member 89 and the coin tube 76 will be swung back by its spring 81. During the return of the handle 75 to its original position, the coin tube 76 is therefore in a swung-back position.

As the coin tube 76 swings forward, its front face engages the rear end of the spindle 59, sliding the spindle 59 forward and disengaging the arm 64 which it carries from the hook-like projection 68 on the end of the arm 57 secured to the main arbor of the time keeping mechanism. At the same time, the lug 79 is carried forward by the coin tube 76 into the plane of rotation of the hook 68 on the clockwork arm 57 and of the spindle 64. Then, when the handle 75 is turned in a clockwise direction as seen from the rear of the instrument, the lug 79 will engage both the hook 68 and the arm 64 and swing them around together towards the wound-up position. During their movement towards that position, the arm 64 and the hook 68 are not in engagement, so that, if the handle 75 is turned less than the proper distance and then released, as might be done by a person attempting to secure repeated operation of the meter with a single coin, the spiral spring 61 on the front end of the spindle 59 will rotate the arm 64 back against the stop 71 as soon as the handle 75 is rotated back against its stop 95 by the handle spring 107. Thus, any attempt to rotate the handle 75 less than the proper distance and to partially wind up the meter without completing the operation and causing the coin to drop down into the coin receptacle will cause the spindle 59 and the hand 36 to assume the same positions which they would have assumed if the meter were not wound up at all. Forward movement of the coin tube 76 also causes the lug 79 carried thereby to project forward into a position to engage both the arm 64 on the spindle 59 and the projection 68 on the arm 57 of the clockwork mechanism so that when the handle 75 and the coin tube 76 are rotated, both of the arms 64 and 57 will be carried around by the lug 79.

Moving the arm 57 around from against the stop 71 winds up the clock work mechanism so that the arm 57 will return to its original position only as the clock work mechanism runs down. The arm 64, however, is held forward out of engagement with the hook 68 until the handle 75 reaches the stop 95 and the coin tube 76 swings back so that, if the handle 75 is allowed to return to its original position before having reached the stop 95, the arm 64, spindle 59 and hand 36 will also return to their original positions and will not indicate that a coin has been deposited in the device. However, if the handle 75 is rotated as far as it will go, the coin tube 76 will spring back when the device is fully wound up, allowing the spindle 59 and the arm 64 to be moved back by the spring 65 so that the end of the arm 64 will engage the projection 68 on the other arm 57. This will hold the arm 64, spindle 59 and hand 36 in a position to indicate that a coin has been deposited in the device, and they will return to their original positions along with the arm 57 on the clock work mechanism at a rate determined by that mechanism. Thus, after a coin has been placed into the device and the handle 75 rotated through its full extent, a patrolman can, by observing the position of the hand 36, determine whether or not the time for which parking is permitted has elapsed since the deposit of the coin. A coin of the proper size, deposited in the coin chute, remains in the upper end of the coin chute even when the coin chute is rotated around to an inverted position until the handle 75 is rotated around against the stop 95. The coin 85 is thus retained by a flange 96 on the disk 72 which carries the coin chute, the flange 96 extending across the mouth of the coin tube 76 and having an opening 97 which is in registry with the mouth of the coin tube only when the coin tube is swung back against the disk 72. Thus, when the coin tube 76 is swung forward away from the disc 72, a coin 85 in the coin tube will be held in by the flange 96. However, when the coin tube is rotated around by the handle 75 and reaches the position in which it is allowed to swing back by the dropping off of the end 92 of the coin tube operating lever 82 from the cam member 89, the mouth of the coin tube will then come into registry with the opening or slot in the flange 96. When this occurs, the coin tube 76 is in an inverted position and the coin 85 falls out into the coin hopper 88.

As may be seen from Figure 13, the coin hopper 88 is divided into front and back sections by a vertical partition 98. The front section of the hopper 88, that to the left in Figure 13, is in line with the lower or pivoted end of the coin tube 76 and receives any coins smaller than the proper size which are inserted into the coin tube and pass right through it into the hopper 88. The rear section of the hopper 88, the section to the right of the partition 98 in Figure 13, is in line with the slot 97 through which coins of the proper size are discharged from the coin tube 76 when the coin tube is inverted and swings back against the disc 72. The under-sized coins, which cannot cause operation of the device, are allowed to pass directly through the front portion of the hopper 88 to the coin receptacle 23, but means are provided for holding up the coins which have caused operation of the device and allowing them to be inspected. This means comprises a lug 99 which projects into the rear part of the coin hopper 88 and which prevents coins from falling directly through into the coin receptacle 23. The back wall of the coin hopper is provided with an aperture 101, as shown in Figures 7 and 13, through which a coin resting on the lug 99 may be seen. A window 102 in the cover plate 24 on the back of the instrument is in registry with the opening 101 and allows a patrolman to inspect the coins resting on the lug 99 and see whether or not it is the proper coin or some fraudulent substitute. Each time that a new coin is placed in the instrument and the crank 75 is turned, the last coin is allowed to drop down into the receptacle 23, and the new coin is caught by the lug 99. Thus, the coin visible at the window 102 is always the last coin which has been inserted.

Withdrawal of the lug 99 to allow the coin supported by it to drop into the coin receptacle is accomplished by the swinging of the lever 103 which carries the lug 99. One end of the lever 103 extends tangent to the disc 72 which carries the coin tube 76 and has a flange 104 which acts as a cam surface. The end of the coin tube 76 opposite its mouth projects out past the edge of the disc 72 and is adapted to engage the flange 104 on the coin releasing lever 103 when the coin tube 76 is swung forward away from the disc 72. When the main part of the coin tube 76 is swung forward, the end 108 opposite its mouth is swung back so that when the coin tube is rotated by means of the handle 75, it will operate the lever 103 and cause the lug 99 to be withdrawn. Thus, each time that a coin of the proper size is inserted, and the handle 75 is swung around to operate the meter, the last coin to be deposited is dropped from its position behind the window 102 to make room for the coin which has just been inserted. The lever 103 and lug 99 are returned to their operative positions as soon as this has occurred by means of a spring 105. Actuation of the lever 103 during the return of the handle 75 to its original position does not occur, because during the return movement, the coin tube 76 has swung back against the disc 72 and the end 108 which operates the lever 103 is swung forward into a position where it can no longer engage the flange 104 on the lever.

Figure 5:
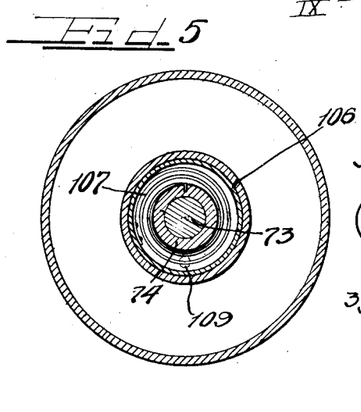
Figure 5 is a cross-sectional view, taken on the line V—V of Figure 4 and looking in the direction of the arrows.
Figure 6:
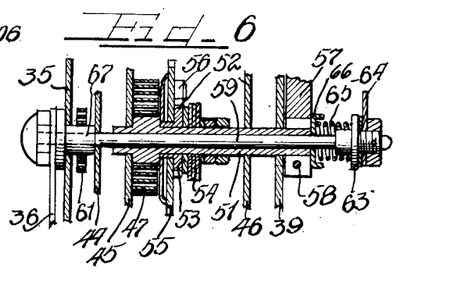
Figure 6 is a longitudinal section through the main arbor of the clock work mechanism showing the spindle passing through the arbor and the parts carried thereby.

Means are provided for automatically returning the handle 75 to its starting position. This means comprises a cup-like member mounted on the shaft 73 and located in a recess in the back of the back plate 38. The cup 106 is connected to a handle 75 by a pin 109 so that it will rotate with the handle, and it contains a spiral spring 107, similar to a clock spring, which has one end fastened to the wall of the cup 106 and the other end engaged in a notch in the outside of the bearing 74, as shown in Figure 5. When the device is assembled, the spring 107 is tensioned so that it will always tend to return the handle 75 to its initial or starting position shown in Figure 1. This assures that a coin of the proper size placed in the coin receiving slot in the side of the housing 21 will roll directly through the coin guide 87 and into the coin tube 76 and allow immediate operation of the apparatus.

From the above description and the accompanying drawings, it will be seen that I have provided a relatively simple and fool-proof device suitable for use as a parking meter. In particular, it will be seen that this parking meter can be caused to operate only by depositing a coin of the proper size and that the provision of the inspection window 102 makes it easy for the patrolman watching the parking meters to detect the use of fraudulent substitutes, such as slugs, of the proper size. In particular, it will be seen that I have provided a parking meter which cannot be repeatedly wound up part way by the use of a single coin because the indicating hand of my meter is not connected to the clockwork mechanism until the coin which has made possible the winding up of the meter has dropped out of the coin chute into a position in which it can no longer enable the winding up connection to be established.

It will also be seen that I have provided a parking meter which is readily adjustable for parking periods of different lengths, the necessary adjustments being made merely by changing the relative angular positions of the hand 36 and the arm 64 on the spindle 59. Changing this angle changes the angle to which the hand 36 will be moved upon the deposit of a coin and the operation of the meter, and causes the operation of the meter to place the hand 36 at any desired number of minutes away from its vertical or zero position.

Briefly, the parking meter operates as follows: When the proper coin is inserted in the meter to rest on the stop 90 in the coin chute, the handle 75 is manually turned to make a revolution in a clockwise direction from its initial position shown in Figure 1, and is then released to be returned to its initial position by the spring 107.

The manual turning of the handle 75 brings into play mechanism which pushes the spindle 59 axially forward, so that the arm 64 is moved clear of the hook 68 on the arm 57, the free end of the pivoted coin chute 76 is pushed forward so that its projecting lug 79 engages the lug 68 on the arm 57 and the arm 64 and thereby compels the arms 57 and 64 to turn with the manually turned handle 75, and so effect the winding of the mainspring of the timing mechanism and the advancing of the pointer 36 to the full-scale position against the action of the spring 61. When the manually turned handle 75 is substantially advanced to the limit of its travel in the clockwise direction, the coin chute and the lug 79 snap back to free the arm 57 for time-controlled movement, the coin drops from the chute into the collection box, and the spindle 59 is released and snaps back to bring the arm 64 into engagement with the hook 68 for time-controlled return movement of the arm.

Should the manually turned handle 75 be released before being turned far enough to effect the snapping back of the spindle 59 and the lug 79 and the collection of the coin, the arm 64 and the pointer 36 return to their initial positions as the handle returns to its initial position, for the coin chute and the lug 79 revolve with the handle, and the arm 64 is urged by the spring 61.

Thus, any attempt to overwind the mainspring by repeated partial turning of the handle at spaced time intervals is rendered useless, for the pointer 36, through its connection with the arm 64, will not assume its normal time-controlled position and movement until the handle 75 has been manipulated properly, and the coin chute has been turned far enough for the coin to drop into the collection box.

While I have shown one particular embodiment of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In combination with a spindle intended to be set to a predetermined angular position only upon the deposit of a coin, a spring for returning said spindle to another angular position, an arm on said spindle, means for catching said arm when said spindle is in said predetermined angular position, a shaft, manual means for rotating said shaft, a coin pocket carried by said shaft and movable relative thereto between first and second positions and rotatable therewith while in either of said positions relative thereto, means operative only when said coin pocket is in said second position for engaging said arm and rotating it with said shaft, means for closing said coin pocket whenever it is in said second position, and means acting on said coin for holding said coin pocket in said second position during rotation of said shaft from a coin receiving position to a coin discharge position, means for rendering said last mentioned means becoming inoperative when said shaft reaches said coin discharge position and for causing the same to remain inoperative thereafter until said shaft again reaches said coin receiving position.

2. In an indicating device, a hollow shaft, clockwork mechanism for slowly rotating the shaft, a spindle journaled in the shaft and axially slidable therein, mechanism for causing the spindle to rotate with the shaft when the spindle is in one axial position and for allowing it to rotate relative to the shaft when it is in a second axial position, and manually controllable means for moving said spindle to said second axial position and rotating it to a predetermined angular position and returning it to the first-mentioned axial position.

3. In an indicating device, a shaft, a spring connected to said shaft and tending to rotate it in one direction, a clockwork mechanism connected to said shaft through a ratchet and permitting it to rotate in said direction at only a predetermined slow speed, said ratchet allowing the shaft to be rotated in the opposite direction against said spring, a rotatable indicator, connecting means for causing said shaft to rotate said indicator, a manually controllable member, and means operable by said member for disconnecting said connecting means and rotating said shaft and said indicator in said opposite direction to predetermined positions and re-establishing said connecting means when said shaft and indicator are at said predetermined positions.

4. In an indicating device, a hollow shaft, a spring connected to said shaft and tending to cause rotation thereof in one direction, a ratchet, a clockwork mechanism connected to said shaft through said ratchet and permitting it to rotate in said direction only at a predetermined slow speed, said ratchet allowing the shaft to be rotated in the opposite direction against said spring, a spindle journaled in said hollow shaft and also longitudinally slidable therein, resilient means tending to rotate said spindle in the same direction as said spring tends to rotate said shaft and tending to slide said spindle axially, disengageable means on said spindle and shaft for preventing rotation of said spindle relative to said shaft by said resilient means, said means being disengageable by sliding said spindle axially in opposition to said resilient means, an indicator connected to said spindle, and manually operable means for sliding said spindle relative to shaft in opposition to said resilient means and rotating said shaft and said spindle to a predetermined position in opposition to said spring and said resilient means and allowing said spindle to slide back under the action of said resilient means and engage said disengageable means.

5. In an indicating device, a hollow shaft, a spring connected to said shaft and tending to cause rotation thereof in one direction, a ratchet, a clockwork mechanism connected to said shaft through said ratchet and permitting it to rotate in said direction only at a predetermined slow speed, said ratchet allowing the shaft to be rotated in the opposite direction against said spring, a spindle journaled in said hollow shaft and also longitudinally slidable therein, resilient means tending to rotate said spindle in the same direction as said spring tends to rotate said shaft and tending to slide said shaft axially, radial arms secured to said shaft and spindle, means for interconnecting said radial arms to prevent rotation of said spindle relative to said shaft under the influence of said resilient means, said connecting means being disengageable by a sliding movement of said spindle against said resilient means, an indicator connected to said spindle, a manually rotatable shaft coaxial with said hollow shaft and spindle and carrying a member rotatable therewith and movable transverse to its plane of rotation, said member in one position being rotatable with said manually rotatable shaft without engaging said arms and in a second position being rotatable with said manually rotatable shaft into engagement with said arms, said member being constructed and arranged so that in moving from the first of said positions to said second position it engages and slides said spindle to disengage the connecting means on said arm, and a cam mechanism for moving said member from said first position to said second position and returning it to said first position as said manually rotatable shaft is rotated.

6. In a coin controlled apparatus, a shaft, an arm on said shaft, a second shaft, means for manually rotating said second shaft, two members carried by said second shaft and rotatable therewith and movable transverse to their planes of rotation, means on one of said members for engaging said arm, and a cam for moving the other of said members transverse to its plane of rotation upon rotation of said other member, one of said members being adapted to hold a coin and the other of said members having a projection adapted to engage said coin and thereby connect said members for simultaneous movement transverse to their planes of rotation to a position for engaging and rotating said arm.

7. In a coin controlled apparatus, a member, means for enforcing movement of said member along a definite path, a coin receptacle, manually operable means for moving said receptacle along either of two paths, said two paths having a common origin and having their major portions at different and constant distances from said first path, means on the coin receptacle for forming a connection to and for moving said member only when said coin receptacle is in the path closer to said first path, resilient means for holding said receptacle in the path farther from said first path, and means operable upon movement of said receptacle away from said origin for pushing on a coin in said receptacle to force said receptacle towards said first pack and thereby to cause said receptacle to remain in the path closer to said first path, said last mentioned means including a cam follower carried by said manually operable means and movable relative thereto transversely to said paths and a stationary cam having an initial sloping portion at an angle to said paths and a main portion extending at a constant distance from said paths, said main portion terminating short of the ends of said paths so that said follower may drop off of and return underneath said cam.

8. In a coin controlled apparatus, a spindle and a radially extending arm connected thereto and intended to be held away from a predetermined angular position only upon the deposit of a coin, a spring connected to said spindle for returning said spindle and arm to said angular position, a member in the return path of said arm for engaging said arm and controlling movement thereof toward said angular position, a shaft coaxial with said spindle, manual means for rotating said shaft, a coin pocket carried by said shaft and movable relative thereto between first and second positions and rotatable therewith while in either of said positions, means connected to said coin pocket and rotatable with said shaft for engaging said arm only when said coin pocket is in said second position and for rotating said arm and spindle with said shaft and away from said angular position, means for closing said coin pocket whenever said coin pocket is in said second position, and means acting on the coin in said coin pocket for holding said coin pocket in said second position during rotation of said shaft from one predetermined position to a second predetermined position whenever there is a coin in said coin pocket, said last mentioned means comprising a member carried by said shaft and movable with respect thereto and a stationary cam engageable by said member upon rotation thereof with said shaft.

9. In a coin controlled apparatus, a first shaft, a second shaft aligned therewith, an arm on said first shaft, manual means for rotating said second shaft, a coin pocket carried by said second shaft and movable with respect thereto, a lug connected to said coin pocket and movable therewith into and out of a position for engagement with said arm, and means responsive to the rotation of said second shaft for engaging and pushing a coin in said pocket to thereby move said lug into said position for engagement.

10. In a coin controlled apparatus, a member, means for enforcing movement of said member along a definite path, a coin receptacle, manually operable means for moving said receptacle along either of two paths, said two paths having a common origin and having their major portions at different and constant distances from said first path, means on the coin receptacle for forming a connection to and for moving said member only when said coin receptacle is in the path closer to said first path, and means operable upon movement of said receptacle away from said origin for pushing on a coin held in said receptacle to force said receptacle towards said first path and thereby to cause said receptacle to remain in the path closer to said first path.

11. In a coin controlled apparatus, a member intended to be moved to a predetermined position only upon the deposit of a coin, a horizontal shaft, a coin chute carried by said shaft, said coin chute extending transverse to said shaft and being movable relative thereto in a direction transverse to the direction in which said chute is carried by rotation of said shaft, a coin inlet passage leading to the upper end of said coin chute, means for receiving coins from the lower end of said coin chute, an obstruction in said coin chute for preventing the passage therethrough of coins of the size with which the device is designed to operate but permitting the passage of smaller coins, a coin engaging element, means for moving said element laterally against a coin resting against said obstruction and displacing said coin and chute relative to said shaft, means carried by said chute and movable into operative position by said movement for forming a connection to said member for moving said member to said predetermined position upon rotation of said shaft to a position in which said chute is inverted above said coin receiving means, means for preventing said coin from falling out of said chute when said chute is displaced relative to said shaft, and means for moving said coin engaging element to displace said chute during the rotation of said shaft to said position, said last mentioned means becoming inoperative when said shaft reaches said position.

12. In a coin controlled apparatus, a spindle and a radially extending arm connected thereto and intended to be held away from a predetermined angular position only upon the deposit of a coin, a spring connected to said spindle for returning said spindle and arm to said angular position, a member in the return path of said arm for engaging said arm and controlling movement thereof towards said angular position, a shaft coaxial with said spindle, manual means for rotating said shaft, a coin pocket carried by said shaft and movable relative thereto between first and second positions and rotatable therewith while in either of said positions, means connected to said coin pocket and rotatable with said shaft for engaging said arm only when said coin pocket is in said second position and for rotating said arm and spindle with said shaft and away from said angular position, means for closing said coin pocket whenever said coin pocket is in said second position, and means acting on the coin in said coin pocket for holding said coin pocket in said second position during rotation of said shaft from one predetermined position to a second predetermined position whenever there is a coin in said coin pocket.

13. In a coin controlled apparatus, a first shaft, a second shaft aligned therewith, an arm on said first shaft, manual means for rotating said second shaft between two positions, a coin pocket carried by said second shaft and movable with respect thereto, a lug carried by said coin pocket and movable therewith into or out of a position for engagement with said arm, means responsive to the rotation of said second shaft away from the initial position thereof for engaging and pushing a coin in said pocket thereby to move said lug into said position for engagement, and means for holding said coin in said pocket until said shaft reaches said second position.

14. In a coin controlled apparatus, a spindle and a radially extending arm and intended to be held away from a predetermined angular position only upon the deposit of a coin, a spring connected to said spindle for returning said spindle and arm to said angular position, a member in the return path of said arm for engaging said arm and controlling movement thereof towards said predetermined angular position, a shaft coaxial with said spindle, manual means for rotating said shaft, a coin pocket carried by said shaft and movable with respect thereto between first and second positions, means for engaging said arm and rotating it with said shaft when said coin pocket is in said second position, means for closing said coin pocket in said second position thereof, and means for engaging said coin and holding said coin pocket in said second position during rotation from a one predetermined position to a second predetermined position.

15. In a coin controlled apparatus, a spindle and a radially extending arm connected thereto and intended to be held away from a predetermined angular position only upon the deposit of a coin, a spring connected to said spindle for returning said spindle and arm to said angular position, a member in the return path of said arm for engaging said arm and controlling movement thereof towards said angular position, a shaft coaxial with said spindle, manual means for rotating said shaft, a coin pocket carried by said shaft and movable relative thereto between first and second positions and rotatable therewith while in either of said positions, means connected to said coin pocket and rotatable with said shaft for engaging said arm only when said coin pocket is in said second position and for rotating said arm and spindle with said shaft and away from said angular position, means for closing said coin pocket whenever said coin pocket is in said second position, and means acting on the coin in said coin pocket for holding said coin pocket in said second position during rotation of said shaft from one predetermined position to a second predetermined position whenever there is a coin in said coin pocket, said last mentioned means being constructed and arranged to cease acting on said coin when said shaft reaches said second predetermined position.

16. In a coin controlled apparatus, a member, means for enforcing movement of said member along a definite path, a coin receptacle, manually operable means for moving said receptacle in one general direction along either of two paths, said two paths having a common origin and having their major portions at different and constant distances from said first path, means on the coin receptacle for forming a connection to and for moving said member only when said coin receptacle is in the path closer to said first path, resilient means for holding said receptacle in the path farther from said first path, and means operable upon movement of said receptacle away from said origin for pushing on a coin in said receptacle to force said receptacle towards said first path and thereby to cause said receptacle to remain in the path closer to said first path, said last mentioned means including a cam follower carried by said manually operable means and movable relative thereto transversely to said paths and a stationary cam having an initial sloping portion at an angle to said paths and a main portion extending at a constant distance from said paths.

17. In a coin controlled apparatus, a spindle intended to be set to a predetermined angular position only upon the deposit of a coin, a spring for returning said spindle to another angular position, an arm on said spindle, means for catching said arm when said spindle is in said predetermined angular position, a shaft, manual means for rotating said shaft, a coin pocket carried by said shaft and movable relative thereto between first and second positions and rotatable therewith while in either of said positions, means operative only when said coin pocket is in said second position for engaging said arm and rotating it with said shaft, means for closing said coin pocket whenever it is in said second position, and means acting on said coin for holding said coin pocket in said second position during rotation of said shaft from a coin receiving position to a coin discharge position, the entrance to said coin pocket facing up when said shaft is in said coin receiving position and facing down when said shaft is in said coin discharge position.

18. In a coin controlled apparatus, a spindle and a radially extending arm connected thereto and intended to be held away from a predetermined angular position only upon the deposit of a coin, a spring connected to said spindle for returning said spindle and arm to said angular position, a member in the return path of said arm for engaging said arm and controlling movement thereof towards said angular position, a shaft coaxial with said spindle, manual means for rotating said shaft, a coin pocket carried by said shaft and movable relative thereto between first and second positions and rotatable therewith while in either of said positions, means connected to said coin pocket and rotatable with said shaft for engaging said arm only when said coin pocket is in said second position and for rotating said arm and spindle with said shaft and away from said angular position, means for closing said coin pocket whenever said coin pocket is in said second position, and means acting on the coin in said coin pocket for holding said coin pocket in said second position during rotation of said shaft from one predetermined position to a second predetermined position whenever there is a coin in said coin pocket, said last mentioned means being constructed and arranged to cease acting on said coin when said shaft reaches said second predetermined position and to remain inoperative while moving back from said second predetermined position to said first predetermined position.

MATTHEW BURLEY.